United States Patent [19]

Imaizumi et al.

[11] Patent Number: 5,149,939
[45] Date of Patent: Sep. 22, 1992

[54] AUTOMATIC WELDING APPARATUS

[75] Inventors: Hiroshi Imaizumi, Tokyo; Toshio Kato, Kodaira; Hideaki Nakashima, Yokohama; Yasuo Murakami, Hikari; Hideki Kashimura; Kiichi Katayama, both of Kawasaki, all of Japan

[73] Assignees: Aichi Sangyo, Co., Ltd.; Nippon Steel Corp., both of Tokyo, Japan

[21] Appl. No.: 757,546

[22] Filed: Sep. 11, 1991

[30] Foreign Application Priority Data

Jul. 3, 1991 [JP] Japan .................. 3-258256

[51] Int. Cl.⁵ .................................... B23K 9/12
[52] U.S. Cl. .................................... 219/125.12
[58] Field of Search ................... 219/125.12, 137 R

[56] References Cited

U.S. PATENT DOCUMENTS 2,505,054  4/1950  McElrath, Jr. et al. ........ 219/125.12
3,989,921  11/1976  Ohi et al. ..................... 219/125.12

FOREIGN PATENT DOCUMENTS 53-137840  12/1978  Japan ..................... 219/125.12
56-4378    1/1981   Japan ..................... 219/125.12
1301616    4/1987   U.S.S.R. ................. 219/137 R Primary Examiner—Clifford C. Shaw
Attorney, Agent, or Firm—Price, Heneveld, Cooper, DeWitt & Litton

[57] ABSTRACT

An automatic welding apparatus for non-consumable-electrode-type arc welding comprises a mechanism which is adapted to feed a second wire in the molten pool and to oscillate this second wire in synchronism with the oscillation of the welding torch and the conventional wire and at a position where both wires are opposed to each other in an axis perpendicular to weld line.

An automatic welding apparatus for consumable-electrode-type arc welding comprises a mechanism which is adapted to feed a second wire in the molten pool and to oscillate this second wire in synchronism with the oscillation of the welding torch and at a position where both wires are opposed to each other in an axis perpendicular to weld line.

9 Claims, 5 Drawing Sheets

AUTOMATIC WELDING APPARATUS

BACKGROUND OF THE INVENTION

1. Field of the Invention

The present invention relates to an automatic welding apparatus for welding pipes and large structures of various metal materials by non-consumable-electrode-type arc welding (TIG arc welding and transferred plasma-arc welding) and consumable-electrode-type arc welding (gas metal arc welding).

2. Description of the Related Art

TIG and plasma are typical conventional non-consumable-electrode-type arc sources. With conventional welding machines using such arc sources, welding is generally performed with a single filler metal wire. It is also the same practice with consumable-electrode-type welding, such as gas metal arc welding.

Although contributing to high-quality welding, conventional non-consumable-electrode-type and consumable-electrode-type arc welding machines can hardly be deemed as satisfactory in terms of production capacity. This is particularly so where changes in welding positions are involved, making it difficult to insure the requisite level of quality and production capacity.

While there is no particular problem in case of flat position welding, when welding fixed pipes or large structures which involves changes in welding position (e.g., overhead position), the molten pool gets bigger and tends to drip hampering improvement in production capacity.

SUMMARY OF THE INVENTION

Accordingly the objects of the present invention are to prevent the phenomenon of dripping, thereby attaining an improvement in production capacity and to maintain a high level of productivity in welding.

To achieve the above objects, in accordance with the present invention, there is provided an automatic welding apparatus for non-consumable-electrode-type arc welding in which welding is performed while oscillating a welding torch and a wire (hereinafter referred to as "the first wire") in a direction perpendicular to the weld line and in a predetermined amplitude and time period, the apparatus comprising a mechanism which is adapted to feed a second wire that is different from the above-mentioned first wire into the molten pool in same direction with the weld line and from the side opposite to the first wire, and which is adapted to oscillate the second wire in synchronism with the oscillation of the welding torch and the first wire and at a position where both wires are opposed to each other on an axis perpendicular to the weld line. In accordance with this invention, there is further provided an automatic welding apparatus for consumable-electrode-type arc welding in which welding is performed by continuously feeding a wire (hereinafter referred to as the "first wire") while oscillating a welding torch in a direction perpendicular to the weld line and in a predetermined amplitude and time period, the apparatus comprising a mechanism which is adapted to feed a second wire into the molten pool in same direction with the weld line and which is adapted to oscillate the second wire in synchronism with the oscillation of the welding torch and at a position where both wires are opposed to each other on an axis perpendicular to weld line.

With the above automatic welding apparatus for consumable-electrode-type arc welding, the second wire is likewise fed to the molten pool and melted therein by utilizing the latent energy of the molten pool, i.e., the high temperature heat thereof. The melting of this second wire results in a loss of the latent energy of the molten pool, i.e., the heat thereof, whereby the molten pool is cooled.

Further, in both non-consumable-electrode-type and consumable-electrode-type arc welding, the welding torch is oscillated in synchronism with the second wire, thereby reducing residual stress of work due to weld heat distortion.

Thus, the phenomenon "dripping off the molten pool" can be prevented, thereby attaining an improvement in production capacity and maintaining a high level of productivity. This effect is particularly remarkable when work material is such low thermal conductivity metal as inconel or stainless steel.

DETAILED DESCRIPTION OF THE PREFERRED EMBODIMENT

An embodiment of the present invention will now be described with reference to the accompanying drawings.

Figure 1:
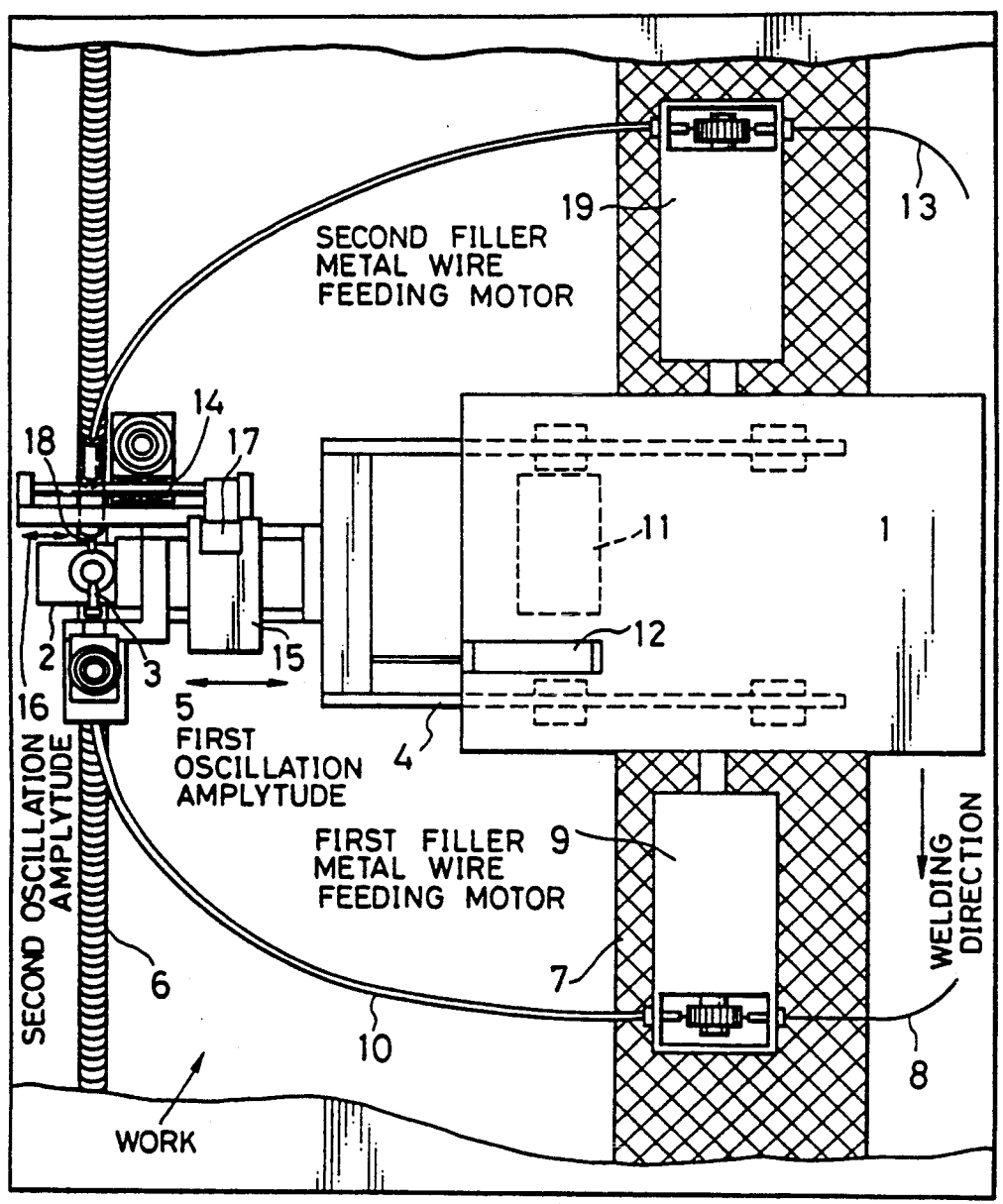
FIG. 1 is a general view of an automatic welding apparatus formed by incorporating a second filler metal wire in accordance with the present invention in a conventional non-consumable-electrode-type automatic arc welding machine.

FIG. 1 is a general view of an automatic welding apparatus formed by incorporating a second wire (a filler metal wire) in accordance with the present invention in a conventional non-consumable-electrode-type automatic arc welding machine.

In the conventional automatic welding machine, a welding torch 2 and a first filler metal wire nozzle 3 are oscillated in a direction perpendicular to the weld line and in a predetermined amplitude 5 by a first oscillation mechanism 4 while welding is being made by a carriage 1 traveling on rail 7 in the direction indicated by the arrow.

To support efforts to attain the objects of the present invention, a first filler metal wire 8 is fed to the position under arc through a feeding liner 10 and wire nozzle 3 by means of a first-filler-metal-wire feeding motor 9, and, at the same time, is oscillated together with the welding torch 2 by the first oscillation mechanism 4 driven by a first oscillation motor 11, with the oscillation amplitude being detected and corrected by means of a first oscillation amplitude detector 12 adapted to detect and verify a predetermined amplitude.

Figure 2:
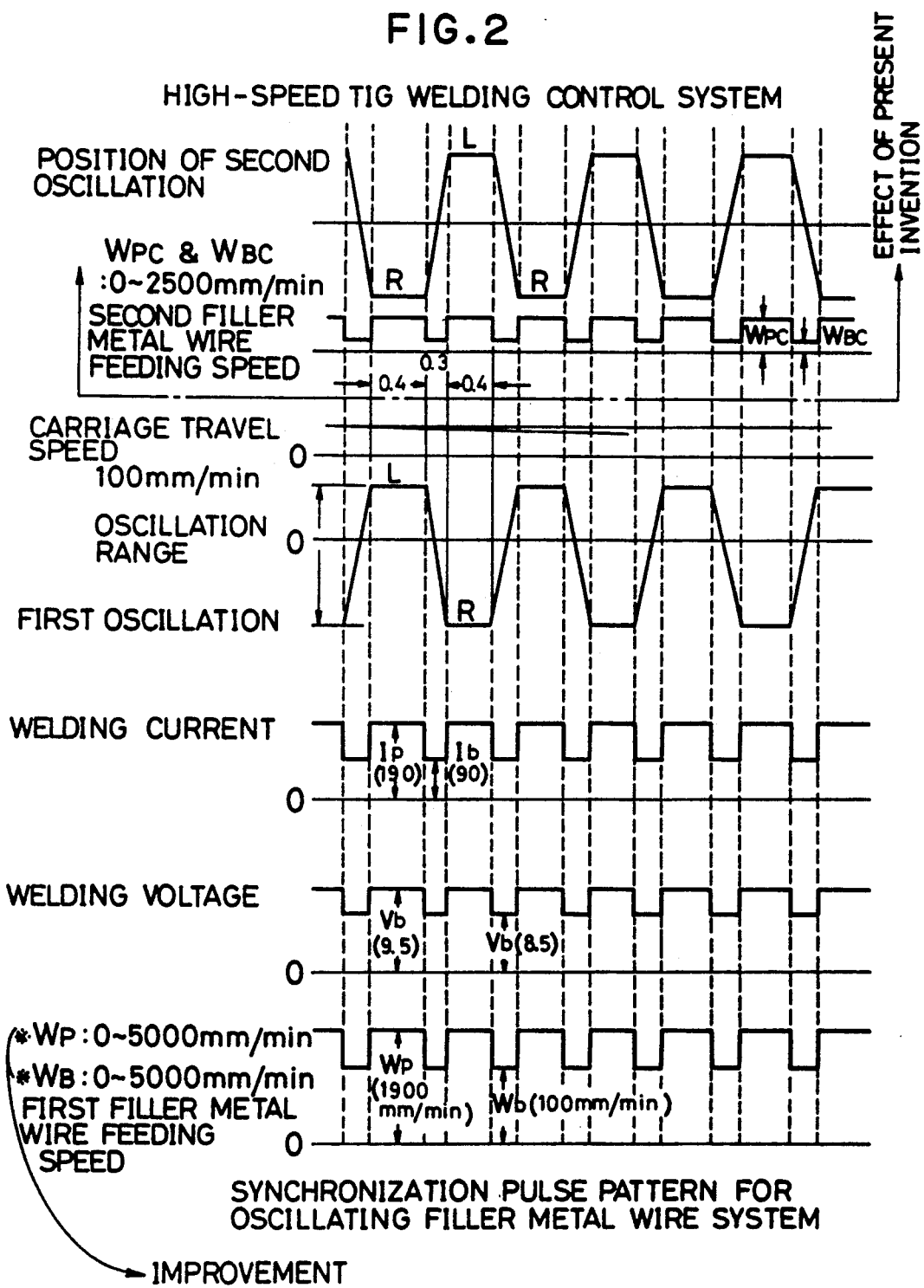
FIG. 2 shows the welding control method of the present invention as compared with a conventional welding control method.

The operation of the conventional welding control system is as shown in the lower section of FIG. 2 parted off by the arrows. The horizontal axis represents the time base. The welding current, the welding voltage, and the first-filler-metal-wire feeding speed are synchronized with the first oscillating movement, and different values are controlled in accordance with the welding torch position in the first oscillation.

That is, on both sides of the joint groove (the left and right walls thereof), the feeding of the filler metal wire is effected with a high level of welding current and welding voltage and at high speed, and, across the joint groove, the feeding of the filler metal wire is effected with a low level of welding current and welding voltage and at low speed. The object of effecting such control is to keep constant the relationship between the welding current, the welding voltage and the filler metal wire feeding speed so as to keep the welding energy constant, thereby allowing the molten pool to extend over the entire width of the joint groove. With this conventional welding control method, however, cooling control can hardly be effected as desired, resulting in the drip-off phenomenon.

With this conventional control method, the cooling of the molten pool can only be effected to a limited degree, and the filler-metal-wire feeding speed has been said to be 20 g/min. at the maximum.

The present invention features the provision of a second metal wire 13 and a second oscillation mechanism 14, as shown in FIG. 1 and in the upper section of FIG. 2 as parted off by the arrows.

As shown in FIG. 1, the second oscillation mechanism 14 is attached to the first oscillation mechanism 4, and is driven by a command supplied to a second oscillation motor 15, such that its movement is completely reverse to that of the first oscillation mechanism 4. For example, it moves to the right when a signal commands the first oscillation mechanism 4 to move to the left.

This second oscillation mechanism 14 oscillates in a predetermined amplitude 16, which is accurately detected and corrected by a second oscillation amplitude detector 17, and the position of a second filler metal wire 18 is controlled, with a second filler metal wire 13 being fed in the molten pool by a second-filler-metal-wire feeding motor 19.

Figure 3:
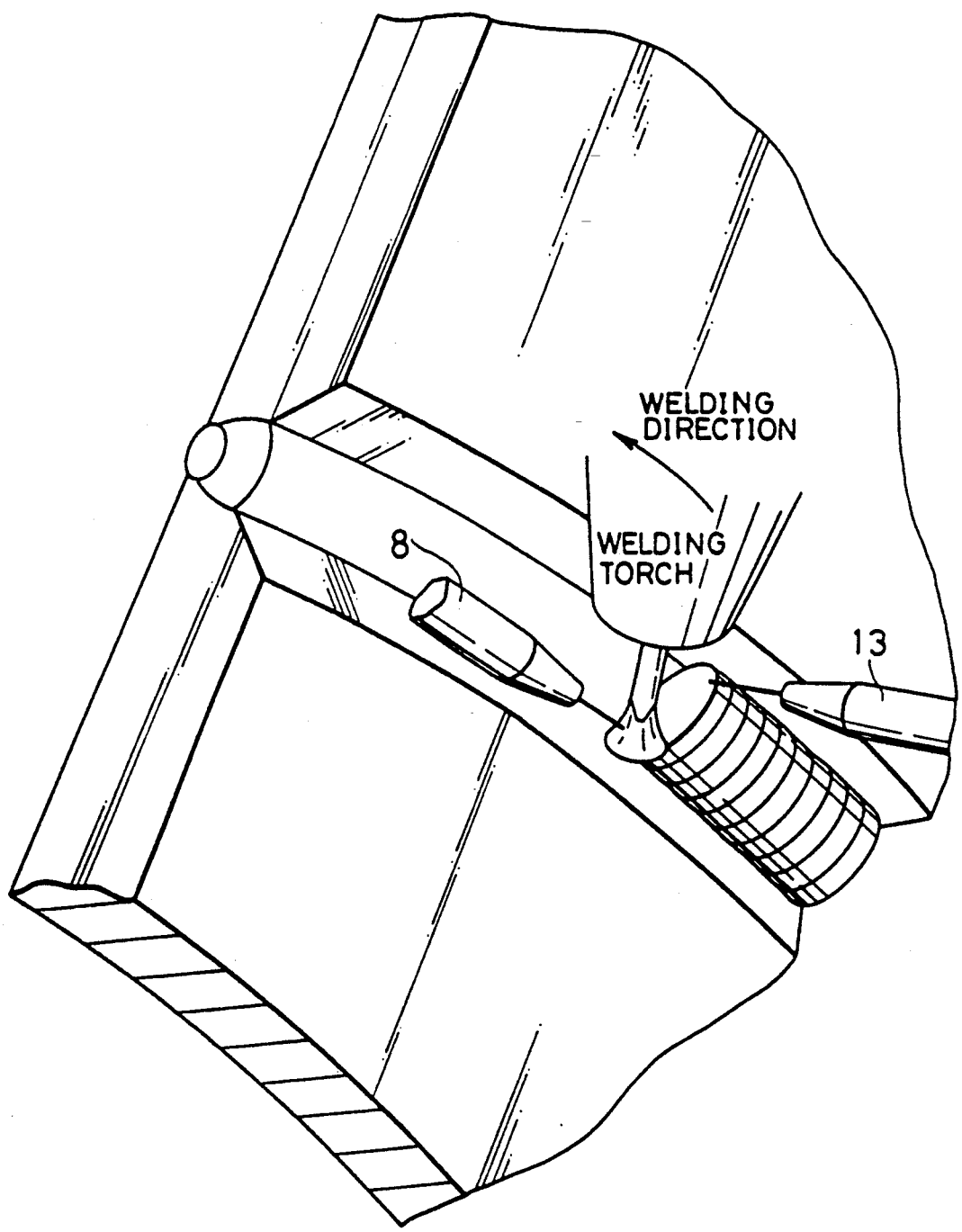
FIG. 3 is a perspective view illustrating an embodiment of the present invention.

These operations are illustrated three-dimensionally in FIG. 3.

The time base control is effected as shown in FIG. 2.

When the welding torch 2 and the first filler metal wire 8 are being moved to the right, the second filler metal wire 13, moved to the left by the second oscillation mechanism 14, is fed in the molten pool, which has not been cooled yet and which is still in a molten state. When this second filler metal wire 13 is melted, the latent energy (heat) of the molten pool is decreased, whereby the cooling of the molten pool is promoted.

Further, in the present invention, the second filler metal wire 13 is synchronized with the movement of the conventional welding torch 2 and the first filler metal wire 8, making a completely reverse movement on an axis perpendicular to the weld line.

Figure 4:
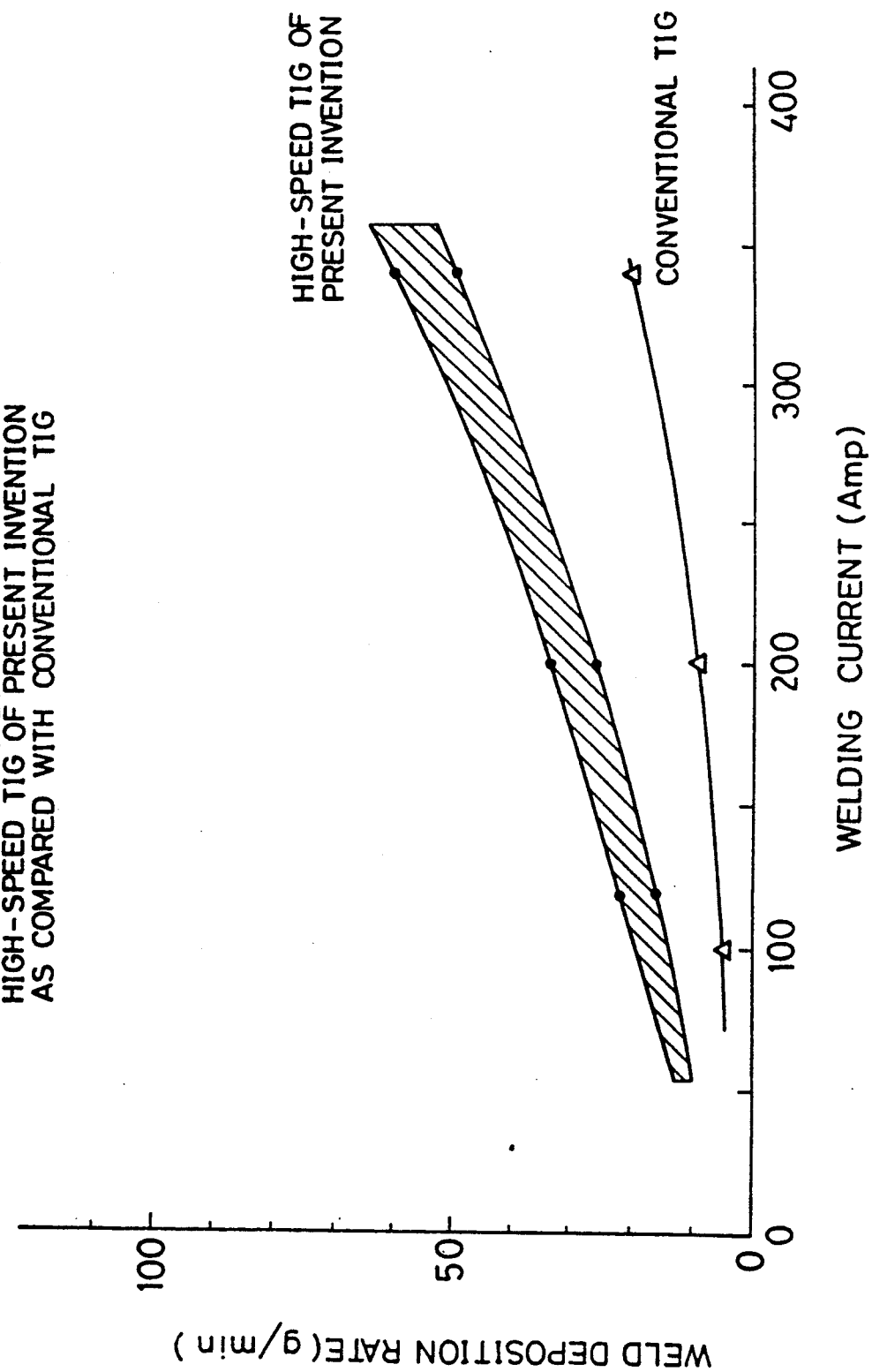
FIG. 4 shows the change in weld deposition speed with respect to welding current in this invention as compared with that in the prior art.

FIG. 4 shows changes in weld deposition speed with respect to welding current.

The horizontal axis represents welding current and the longitudinal axis represents weld deposition speed. FIG. 4 indicates that the weld deposition speed in this invention is three times higher than that in the prior art. That is, a weld deposition speed of 60 g/min. can be attained where only 20 g/min. is possible in the prior art.

Figure 5:
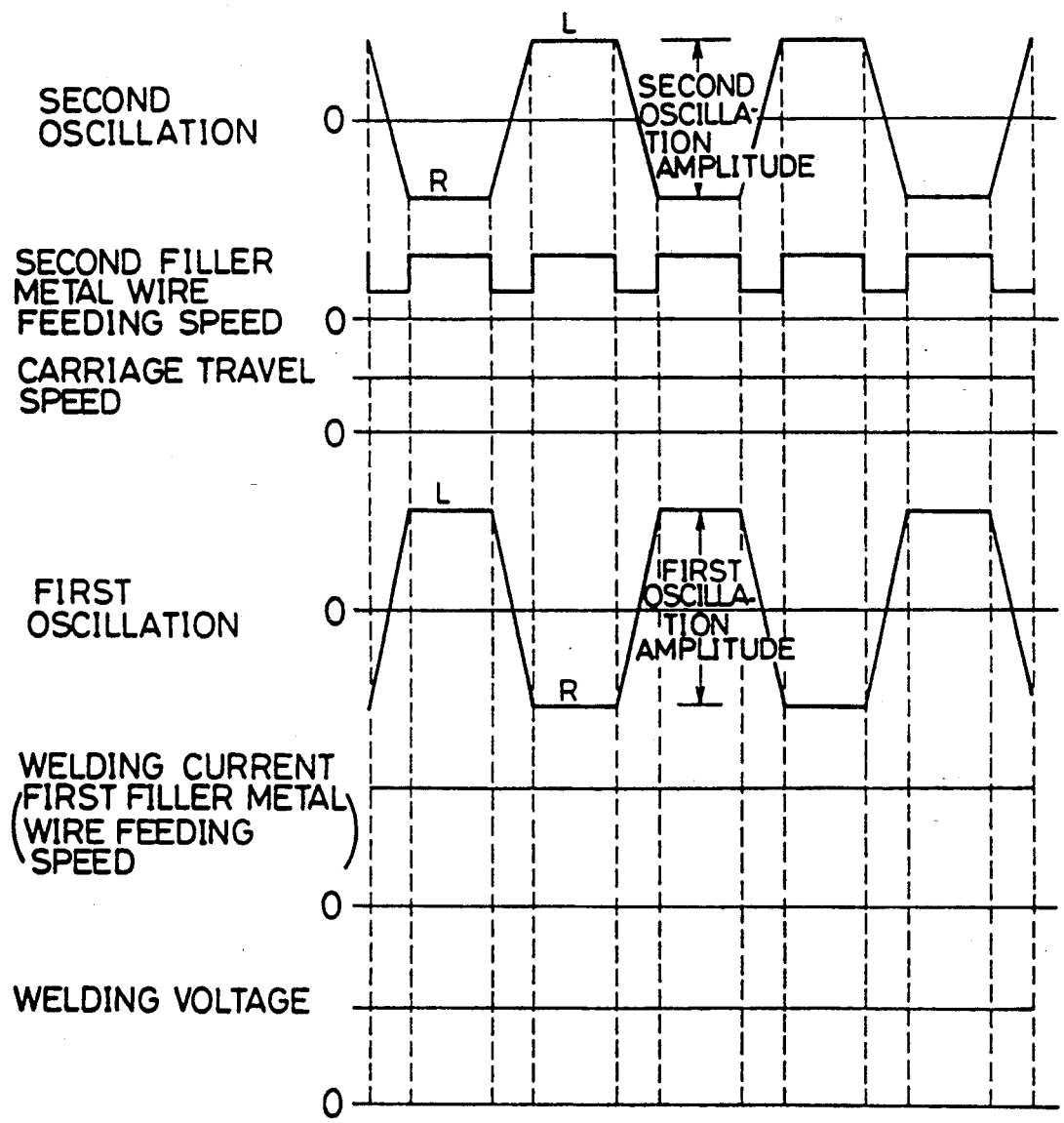
FIG. 5 shows the time-base control of the non-consumable-electrode-type arc welding in accordance with this invention.

While the above description has been made about non-consumable-electrode-type arc welding, it also applies to consumable-electrode-type arc welding. FIG. 5 shows an example of time-base control of consumable-electrode-type arc welding in accordance with the present invention.

In the conventional consumable-electrode-type arc welding, the welding current is controlled depending on changes in the filler-metal-wire feeding speed, so that the molten pool is still more difficult to control than in the case of non-consumable-electrode-type arc welding.

In accordance with the present invention, however, the inherently high productivity of the consumable-electrode-type arc welding can be maintained by feeding the second filler metal wire into the molten pool so as to effect the cooling control of the molten pool to a sufficient degree, thereby reducing substantially the time required for the welding of pipes or large structures.

With the construction described above, the present invention can prevent the phenomenon of dripping of the molten pool due to the loss of the balance between the gravity and surface tension of the molten pool when the welding position (overhead) changes. Further, by synchronizing oscillation of the second wire with the oscillation of the welding torch, residual stress in work due to weld heat distortion can be reduced, and an improvement in productivity can be attained and sound welded joint is insured. These effects are particularly remarkable when work material is such low thermal conductivity metal as inconel or stainless steel.

What is claimed is:

1. In an automatic welding apparatus for non-consumable-electrode-type arc welding in which welding is performed while oscillating a welding torch and a first wire in a direction perpendicular to a weld line and in a predetermined amplitude and time period, said welding torch and said first wire forming a molten pool of metal along said weld line, the improvement comprising a mechanism which is adapted to feed a second wire into said molten pool in the same direction with the weld line and from the side opposite to said first wire, and which is adapted to oscillate said second wire in synchronism with the oscillation of said welding torch and said first wire and at a position where both wires are opposed to each other along an axis perpendicular to said weld line.

2. An automatic welding apparatus as set forth in claim 1, wherein the motion of said first and second wires is substantially synchronous but in opposite directions.

3. An automatic welding apparatus as set forth in claim 1, wherein said second wire is fed into said molten pool at a rate sufficient to maintain the molten state of said pool while at the same time removing sufficient latent heat from said pool to reduce the mobility of said pool.

4. An automatic welding apparatus as set forth in claim 1, wherein the amplitude of the oscillation of said second wire is less than that of said first wire.

5. An automatic welding apparatus as set forth in claim 1, wherein said mechanism for feeding said second wire is supported by the mechanism for feeding said first wire and moves in a direction opposite to the direction of movement of said mechanism for feeding said first wire.

6. In an automatic welding apparatus for consumable-electrode-type arc welding in which welding is performed by continuously feeding a first wire while oscillating a welding torch in a direction perpendicular to a weld line and in a predetermined amplitude and time period to form a molten pool of metal along said weld line, the improvement comprising a mechanism which is adapted to feed a second wire into said molten pool in the same direction with the weld line and which is adapted to oscillate said second wire in synchronism with the oscillation of the welding torch and at a position where both wires are opposed to each other in a direction perpendicular to said weld line.

7. An automatic welding apparatus as set forth in claim 6, wherein the motion of said first and second wires is substantially synchronous but in opposite directions.

8. An automatic welding apparatus as set forth in claim 6, wherein said second wire is fed into said molten pool at a rate sufficient to maintain the molten state of said pool while at the same time removing sufficient latent heat from said pool to reduce the mobility of said pool.

9. An automatic welding apparatus as set forth in claim 6, wherein the amplitude of the oscillation of said second wire is less than that of said first wire.

* * * * *